United States Patent [19]
Baldwin et al.

[11] 4,379,535
[45] Apr. 12, 1983

[54] PALLET RESTRAIN SYSTEM

[75] Inventors: Floyd G. Baldwin, Garden Grove; Donald E. Evans, Marina Del Rey, both of Calif.

[73] Assignee: McDonnell Douglas Corporation, Long Beach, Calif.

[21] Appl. No.: 280,460

[22] Filed: Jul. 6, 1981

[51] Int. Cl.³ .......................... B64D 1/10; B64D 1/12
[52] U.S. Cl. .................................. 244/137 R; 410/78
[58] Field of Search ............ 244/118.1, 137 R, 138 R; 410/69, 77, 78, 79, 92; 269/26; 292/256,257; 254/133 R; 91/520, 531; 294/88, 83 R

[56] References Cited
U.S. PATENT DOCUMENTS

| | | | |
|---|---|---|---|
| 856,416 | 6/1907 | Mclarty | 269/26 |
| 4,114,718 | 9/1978 | Lipshield | 410/77 |
| 4,349,168 | 9/1982 | Barnes et al. | 410/79 |

FOREIGN PATENT DOCUMENTS 1480442 4/1967 France .................. 244/137 R L

*Primary Examiner*—Galen L. Barefoot
*Attorney, Agent, or Firm*—John P. Scholl; George W. Finch; Donald L. Royer

[57] ABSTRACT

A pallet restraint system for use in the cargo bay of an aircraft in an air drop sequence. The system assures an equal application of the parachute extraction force and simultaneous release of all load sensitive latches by means of hydraulic interconnectors between the latches to vary their position.

6 Claims, 7 Drawing Figures

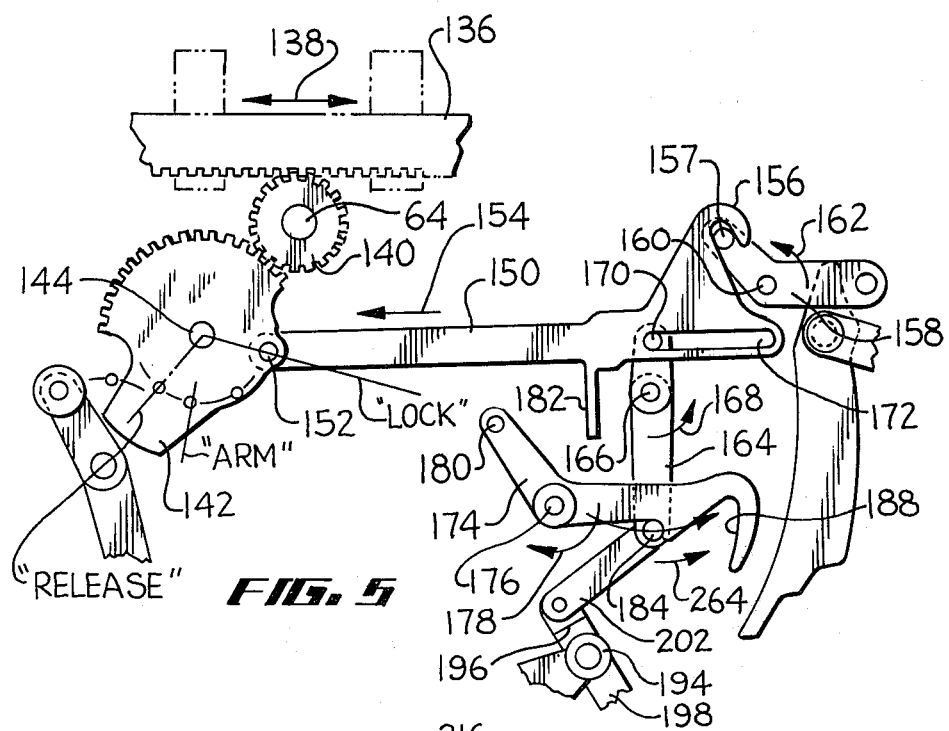
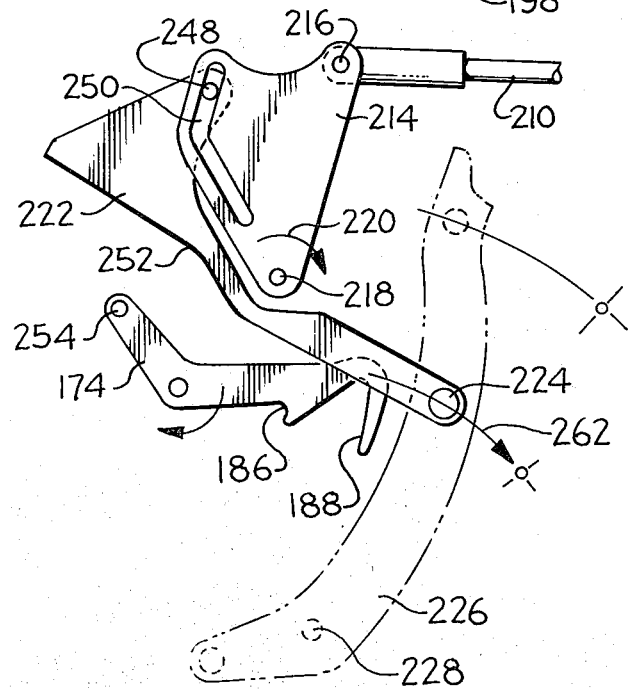

PALLET RESTRAIN SYSTEM

BACKGROUND OF THE INVENTION

Palletized cargo is transported in military aircraft. Sometimes the cargo is transferred from one airport to another. In other instances the cargo may be air dropped by parachute to a remote site.

In an air drop sequence the pallet is restrained laterally by a guide rail on either side and in the longitudinal direction of aircraft flight by load sensitive latches. The latches release when the force of the extraction parachute, attached to the pallet, exceeds a predetermined triggering load level in the latches. The release load level may be adjusted for pallet weight, number of latches engaged, parachute size, and aircraft speed. The load level at which the pallet is released is critical because it ensures that the parachute is fully deployed and will extract the load properly.

A major problem in prior art extracting systems involved a so-called zipper affect. This phenomenon was present when multiple latches restrained a single pallet. When the latches did not engage the pallet evenly and the parachute extraction load was applied differentially to some of these latches, the latches would then release in sequence rather than at a single instant. When that happened, the force to extract the pallet was unpredictable and substantially less than the sum of the restraint force of all the latches. In this instance, when the pallet left the aircraft the parachute might not be fully deployed and the cargo could tumble. If the pallet tumbles it could entangle the recovery chute and the cargo could be lost.

The desired sequence occurs when the parachute is deployed, the extraction force builds to a desired level and all the latches release simultaneously.

SUMMARY OF THE INVENTION

The inventive pallet restraint system avoids the zipper affect and will release the pallet from cargo aircraft at a predetermined extraction force. This force is the sum of the restraint forces of all latches which engage the pallet. The inventive system accomplishes this phenomenon by having a hydraulic equalizing system between the latches which permits all latches engaging a pallet to move slightly so that the extraction force will be applied to these latches evenly. When the hydraulic interconnection has permitted a shift in the position of the latches, the force applied to the pallet builds to the preselected extraction force and all the latches release at the preselected load. The release force in the latches in the inventive system can be varied and the system can also be varied to accommodate pallets of various sizes where different numbers of latches engage a single pallet.

BRIEF DESCRIPTION OF THE DRAWINGS

FIG. 5 is a plan view of a portion of the pallet latch of FIG. 2 showing the mechanism associated with the lock, arm, and release sequence.

FIG. 6 is a plan view of a portion of the latch of FIG. 2 showing the mechanism associated with the setting of the amount of force necessary to cause the latch to release.

DESCRIPTION OF THE PREFERRED EMBODIMENT

Figure 1:
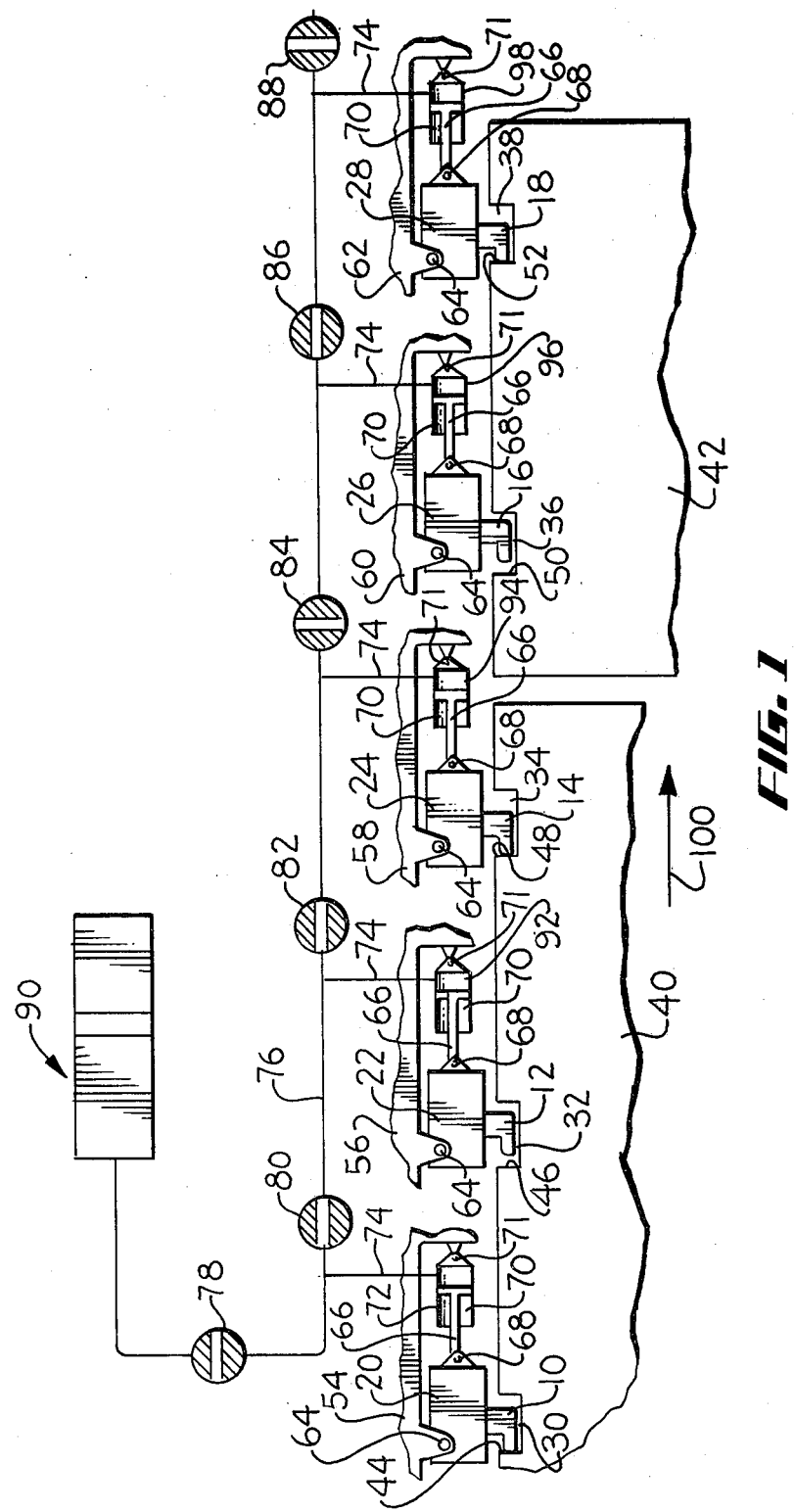
FIG. 1 is schematic view of the pallet release system engaging a single side of two different pallets.

In FIG. 1 the pawls 10, 12, 14, 16, and 18 of a series of latches 20, 22, 24, 26, and 28 have been inserted into notches 30, 32, 34, 36, and 38 in two pallets 40 and 42. Some of the pawls have engaged the edges 44, 46, 48, 50, and 52 of the pallets while in other instances, there is a gap between the pawl and edge of the pallet.

The latches are attached to rails 54, 56, 58, 60, and 62 by pivot pins 64. The rails are hinged to the cargo floor of the aircraft (not shown).

One end of the latch is connected to a piston rod 66 by a pivot pin 68. This piston rod 66 reacts to the force on the pawl and moves in a hydraulic cylinder 70 which is attached to the rail by a pivot pin 71. The piston rod 66 and hydraulic cylinder 70 together form a hydraulic actuator 72 which controls the positioning of the latch 20.

A hydraulic feeder line 74 leads a primary hydraulic system line 76 providing interconnection between the primary hydraulic system line 76 and the hydraulic actuator 72. A series of shutoff valves 78, 80, 82, 84, 86, and 88 in the primary hydraulic system line 76 may be opened or closed to isolate or interconnect various hydraulic actuators.

At one end of the hydraulic system line is a hydraulic accumulator 90 which operates at a low pressure. The hydraulic accumulator 90 is used to deliver hydraulic fluid to all the hydraulic lines and individual actuators when all shutoff valves are open. When fluid has filled the entire hydraulic system and all air has been bled off individual shutoff valves can be closed to isolate the actuators which are associated with one pallet from another group of actuators associated with second pallet. For example, valves 78 and 84 are closed to isolate actuators 72, 92 and 94 associated with pallet 40. Valves 84 and 88 isolate actuators 96 and 98 associated with pallet 42.

Figure 7:
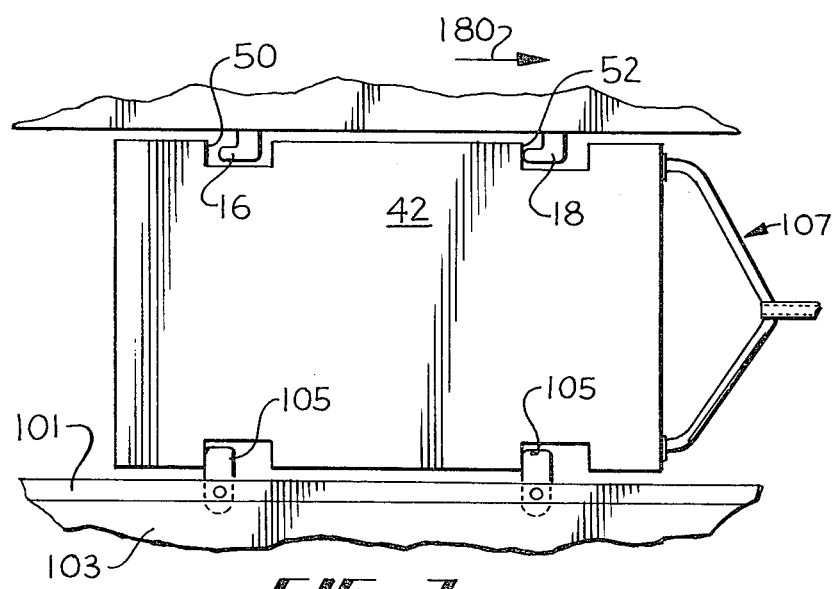
FIG. 7 is a plan view of single pallet in cargo bay of aircraft prior to parachute extraction.

In FIG. 1 the pallets are to be extracted from the cargo bay of the aircraft to the right in the direction of arrow 100. On the opposite side, pallet 42 (FIG. 7) engages guide rail 101 attached to the floor 103 of the cargo bay. This guide rail 101 together with the non-load sensitive latches 105 hold the pallet 42 in position for engagement by the latches 16 and 18 during positioning and latching of pallet 42 as it is initially loaded into the aircraft. During flight both the non-load sensitive latches 105 and the load sensitive latches 16 and 18 restrain pallet 42. The rail 101 assists in guiding the pallet 42 out of cargo bay as it is pulled out of the cargo bay by a harness 107 attached to a parachute (not shown). The non-load sensitive latches 105 engage the side of pallet 42 to hold the pallet from movement until the time for an air drop sequence.

In preparation for a parachute drop, the non-load sensitive latches 105 are released leaving only the load sensitive latches holding the pallet from longitudinal movement.

As the parachute pulls pallet 42 to the right, (FIG. 1) the hydraulic fluid in actuator 98 is forced out of the cylinder by piston 66 through lines 74 and 76 to actuator 96. As the fluid enters actuator 96 it forces the piston rod 66 out of cylinder 70. The rod rotates the latch 28 about pin 64. Eventually pawl 16 engages the edge 50 of the pallet 42. When both pawls, 16 and 18, have engaged the edges 50 and 52 of pallet 42 the hydraulic pressure, which is constant throughout the isolated line, builds up as the hydraulic actuators react to parachute extraction force applied to latches 26 and 28. Latches 26 and 28 which have previously been set at the same release force reach the release force level simultaneously and release pallet 42 together.

The extraction of pallet 40 from the aircraft is by means of another extraction parachute and involves the same sequence. As the parachute pulls pallet 40 to the right, hydraulic fluid in actuators 72 and 94 is forced from these actuators and passes through the lines 74 and 76 to actuator 92. Piston rod 66 is forced out of cylinder 70, rotating latch 22 and pawl 12 about pivot pin 64 until pawl 12 engages the side 46 of the notch 32 in the pallet 40. Once all the pawls 10, 12, and 14 have engaged the pallet 40 the hydraulic pressure in the isolated system builds up as the hydraulic actuators react the parachute extraction force applied to the latches 20, 22 and 24. When these latches, having been previously set at the same release force, reach the release force level they all simultaneously release pallet 40.

Figure 2:
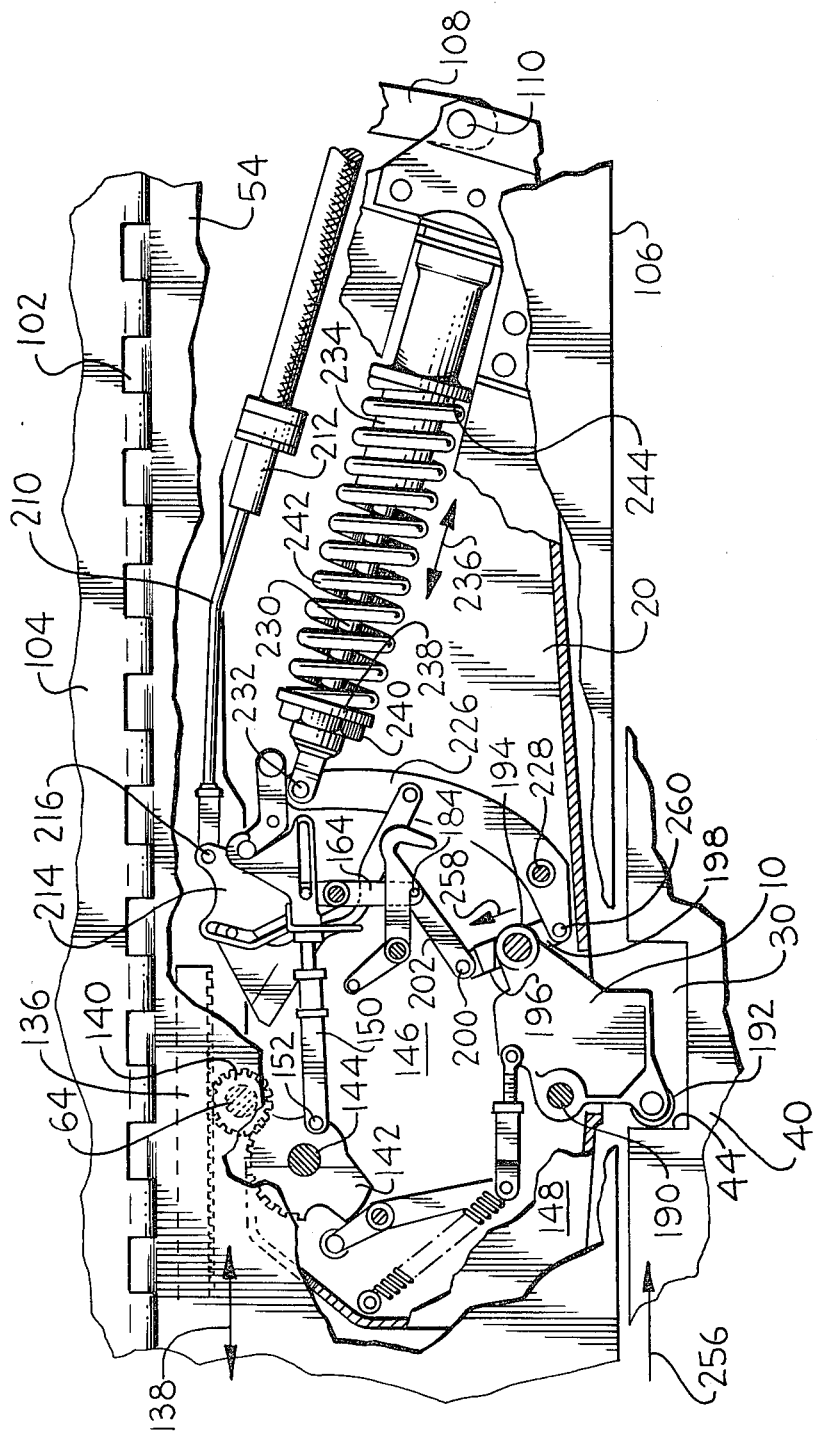
FIG. 2 is a plan view of the pallet latch.
Figure 3:
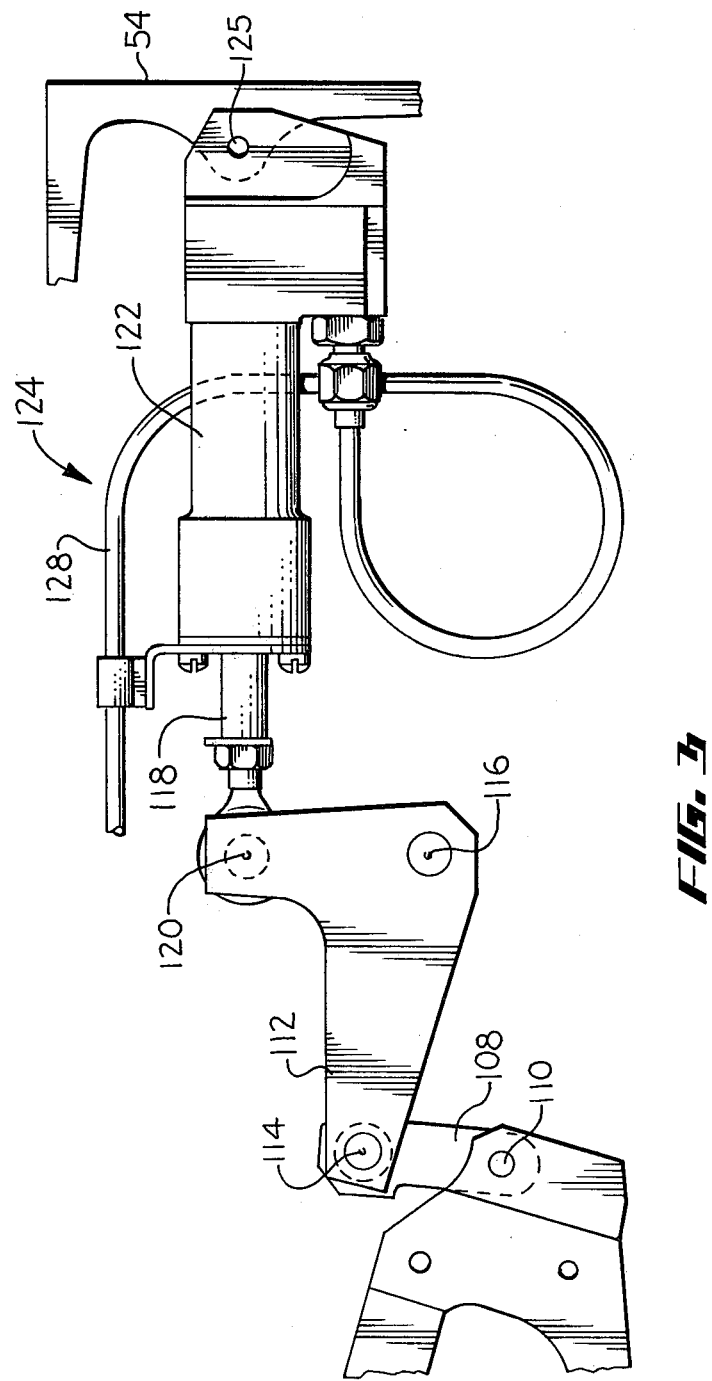
FIG. 3 is a plan view of the hydraulic cylinder attached to the pallet latch.

FIG. 2 shows an enlarged view of the mechanism of the latch 20 as schematically represented in FIG. 1. All latches are identical and operate in the same manner. The latch mechanism 20 is rotationally mounted in rail 54 by main pivot pin 64. Rail 54 is in turn attached by a piano hinge 102 to the floor 104 of the cargo bay of the aircraft. One edge 106 of the hinged rail 54 from which the pawl 10 protrudes is rotationally elevated from the cargo floor 104 by a gear mechanism (not shown) so that the pawl 10 can engage edge 44 of the pallet 40 in notch 30. Latch mechanism 20 is also rotationally connected to link 108 by pin 110. In FIG. 3, link 108 is connected to crank 112 by pin 114. Crank 112 is rotationally mounted to rail 54 by a pin 116. Crank 112 is also rotationally connected to piston rod 118 by pin 120. Piston rod 118 moves within hydraulic cylinder 122 forming a hydraulic actuator 124. Actuator 124 is mounted to rail 54 by pin 125. Hydraulic line 128 corresponds to line 74 in FIG. 1.

Figure 4:
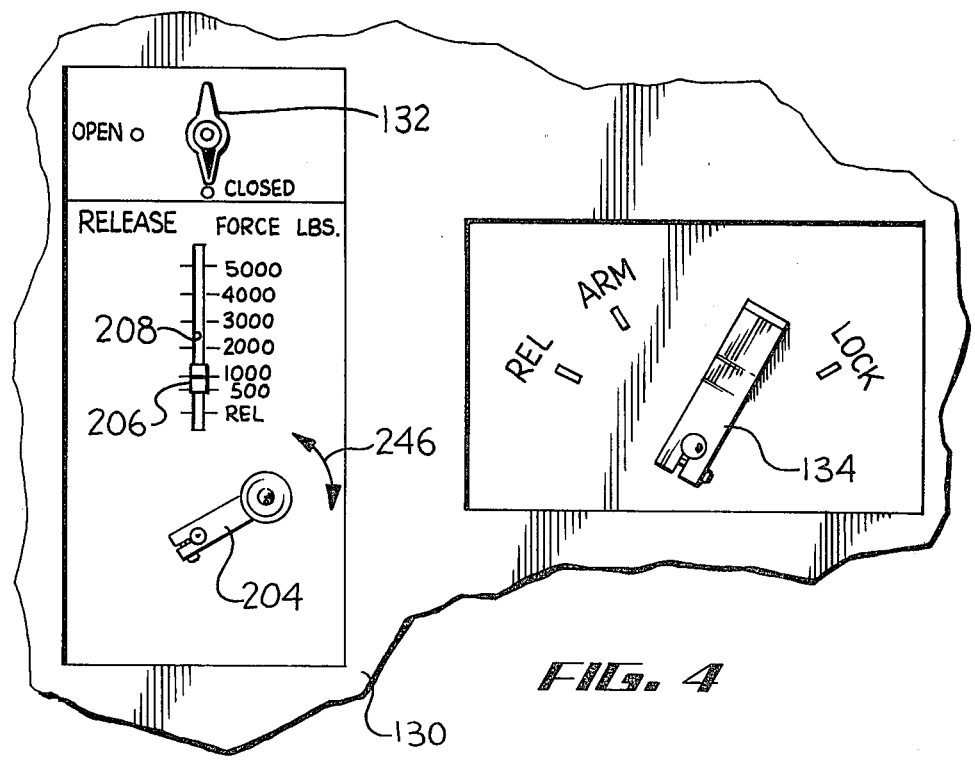
FIG. 4 is an elevation view of the controls for activating the pallet restrain system.

FIG. 4 shows a portion of the wall 130 of the cargo bay of the aircraft with the controls for operating the latching mechanism. The valve 132 is an open and close shutoff valve and corresponds to valve 80 in FIG. 1.

The lock, arm and release handle 134 is connected by a linkage to extend or retract the control bar 136 (FIGS. 2 and 5) in the directions of double ended arrow 138. The latch mechanism 20, as shown in FIG. 2 and 5, is in the "lock" position. As the bar moves to the left it turns spur gear 140 counterclockwise and sector gear 142 is turned clockwise.

Spur gear 140 is mounted on main pivot pin 64 which, as described above, is attached to rail 54. Sector gear 142 is mounted for rotation on pin 144 which is located between latch side panels 146 and 148 (FIG. 2). Latch side panels 146 and 148 enclose the latch and provide a structure for mounting components of the latch.

Release bar 150 is attached by a pin 152 to the sector gear 142 and as the sector gear 142 rotates clockwise the bar 150 moves in the direction of the arrow 154 in FIG. 5. The opposite end of the release bar 150 has a hook 156 which engages pin 157 on release crank 158. Release crank 158 is mounted for rotation on pin 160 which is attached between latch side panels 146 and 148. The release crank 158 is spring biased for rotation by a coil spring (not shown) in a counterclockwise direction of the curved arrow 162. Lever 164 is mounted for rotation on pin 166 which is attached between latch side panels 146 and 148. Lever 164 is biased by a coil spring (not shown) to rotate in a counterclockwise direction of curved arrow 168. On one end of lever 164 is a pin 170 which moves in slot 172 in the release bar 150.

Hook crank 174 is mounted for rotation on a pin 176 which is attached between latch side panels 146 and 148. Hook crank 174 is biased by a coil spring (not shown) to rotate in a clockwise direction of curved arrow 178. Hook crank 174 has a pin 180 at one end which may be engaged by finger 182 on release bar 150.

In the "arm" condition of latch 20 bar 150 has moved to the left of the position shown in FIG. 5 and finger 182 on release bar 150 just clears pin 180. On the other end of lever 164 is a pin 184 which is held by shoulder 186 (FIG. 6) of hook crank 174 when the latch is in the "arm" position.

In the "release" condition of latch 20 finger 182 on release bar 150 engages the pin 180 in the end of the hook crank 174 rotating hook crank 174 in a counterclockwise direction against the bias of the coil spring attached to the hook crank 174. When the hook crank 174 rotates counterclockwise it releases pin 184 from shoulder 186. Lever 164 then rotates by spring bias in a counterclockwise direction and pin 184 is caught in hook 188 of hook crank 174. This action will through interaction of the parts in latch 20 (hereinafter described) permit pawl 10 to rotate and release the pallet 40 which has been restrained.

Referring to FIG. 2, pawl 10 is mounted for rotation on a pin 190. The pin 190 is mounted between latch side panels 146 and 148. When roller 192, mounted on the edge of pawl 10, engages the edge 44 of pallet 40 it biases the pawl for rotation in a counterclockwise direction around pin 190. A second roller 194 mounted on pawl 10 engages a shoulder 196 of retainer link 198. Retainer link 198 is attached for rotation by a pin 200 to the link 202. The link 202 is attached by a pin 184 to lever 164 (FIG. 5).

Referring to FIG. 4 when release force handle 204 is rotated it moves indicator 206 in slot 208 by a conventional bevel gear and lead screw means. At the same time, by lead screw means, rod 210 is extended or retracted from tube 212 (FIG. 2). Rod 210 is pivotably attached to V-plate 214 by pin 216. V-plate (see FIG. 6) is mounted for rotation on pin 218. Pin 218 is mounted between the latch side panels 146 and 148. V-plate 214 is spring biased to rotate about pin 218 in a clockwise direction in the direction of curved arrow 220 by a coil spring (not shown). Trip arm 222 is mounted for rotation by pin 224 to the force lever 226. Force lever 226 is mounted on pin 228 for rotation. Pin 228 is mounted between the latch side panels 146 and 148. One end of force lever 226 is mounted for rotation to rod 230 by pin 232 (FIG. 2). Rod 230 is mounted, held and travels in cylinder 234 in the direction of doubled-ended arrow 236.

Mounted on rod 230 is a retaining washer 238 and lock nut 240. The washer 238 holds coil spring 242 in position surrounding rod 230 against a shoulder 244 on cylinder 234.

When it is desired to set a force at which the latch will release, crank 204 is turned in one of the directions of curved doubled-ended arrow 246 until indicator 206 matches the desired force release level adjacent to slot 208. This movement of crank 204 extends or retracts rod 210 which rotates V-plate 214 about pin 218. The rotation of V-plate 214 sets the position of trip lever 222 by means of pin 248 moving in slot 250 (FIG. 6). Trip lever edge 252 moves either closer to or further away from pin 254. The closer trip lever edge 252 is to pin 254 the less force applied to pawl 10 will release the latch 20. At this time, handle 134 must be set in the "arm" position unless it was already in this position. Release is accomplished when coil spring 242 is compressed and trip lever is moved in direction of 262 so that edge 252 engages pin 254. When edge 252 engages pin 254 it rotates hook crank 174 in a counterclockwise direction releasing pin 184 from shoulder 186 and thereafter the action of latch 20 is similar to moving handle 134 to the "release" position as herein above described.

To release the latch 20, force from the extraction parachute is applied to pallet 40 in the direction of arrow 256 in FIG. 2. Once all latches associated with pallet 40 have moved to engage the pallet 40, the hydraulic fluid in the isolated system is constrained at constant pressure throughout the system. The extraction force is then transmitted to pawl 10 and into a rotational movement around pin 190. Roller 194 in turn engages the shoulder 196 of release link 198. Shoulder 196 prevents movement of roller 194 in the direction of arrow 258 in FIG. 2. Force lever 226 is mounted for rotation to retainer link 198 by pin 260. As extraction force is applied to pawl 10, force lever 226 rotates around pin 228 in a clockwise direction. As force lever 226 rotates it compresses coil spring 242. At the same time, (refer to FIG. 6) force lever 226 moves trip lever 222 in direction of arc 262. Pin 248 attached to trip lever 222 moves in slot 250 and the edge 252 approaches pin 254 on hook crank 174. When the edge 252 of trip lever 222 engages pin 254 on hook crank 174, as herein above described, it rotates hook crank 174 against spring bias in a counterclockwise direction. Hook crank 174 moves counterclockwise releasing pin 184 from shoulder 186. The release of pin 184 permits lever 164 to rotate in counterclockwise direction about pin 166. When lever 164 rotates in a counterclockwise direction it swings the end of the link 202 in an arc in the direction of arrow 264. As link 202 moves in the direction of arrow 264 (FIG. 5) it pulls release link 198 in the same direction and releases roller 194 from the shoulder 196 of release link 198. When roller 194 is no longer restrained by release link 198, pawl 10 can rotate about pin 190 in a counterclockwise direction and roller 192 moves out of the notch 30 releasing pallet 40.

What is claimed is:

1. A restraint system for use on floor in aircraft cargo bay to engage and hold a pallet in air drop sequence comprising:
   two load sensitive latches moveably mounted on said floor in such a manner that they will engage one side of the pallet;
   hydraulic actuators attached to said latches and to said cargo floor to provide movement to said latches;
   hydraulic interconnection between hydraulic actuators to provide transfer of hydraulic fluid from one actuator to the other, thereby moving the latches into full engagement with said pallet, and
   guide means to engage the side of the pallet opposite the load sensitive latches to assist in restraining and guiding of said pallet from said aircraft cargo bay.

2. The restraint system of claim 1 wherein the load at which the load sensitive latches release can be varied.

3. The restraint system of claim 2 wherein the latches can be locked to prevent release.

4. The restraint system of claim 3 wherein the latches can be released regardless of load.

5. The restraint system of claim 4 wherein the latches are rotationally mounted to the floor and may be elevated from a flush floor position to engage a pallet.

6. A pallet restraint system for use in floor of cargo aircraft during an air drop sequence comprising:
   two load sensitive latches mounted for rotational movement on said floor of the aircraft to engage one side of said pallet;
   guide means attached to the aircraft floor to engage the side of the pallet opposite said latches to assist in the restraint of the pallet and guiding of the pallet out of the aircraft in the air drop sequence;
   hydraulic actuators attached to the floor of the aircraft and to said latches to provide movement to said latches, and
   a hydraulic connector for transfer of hydraulic fluid from one actuator to the second to adjust the position of said actuators to provide for full engagement of said pallet, and equalization of loads among several latches.

* * * * *